J. MITCHELL.
LOCK NUT AND BOLT.
APPLICATION FILED JAN. 13, 1915.
1,190,445.
Patented July 11, 1916.
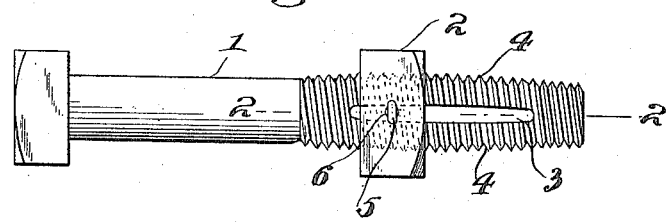
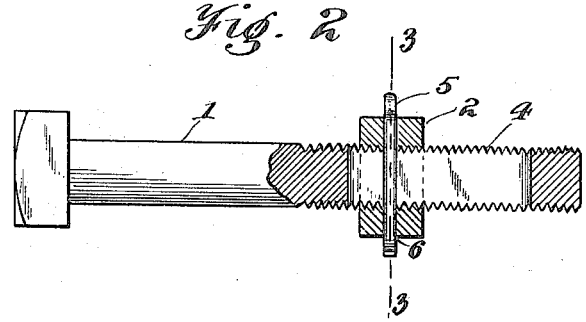
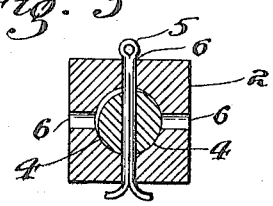
Witnesses
F. H. Shallenberger
Inventor
Jacob Mitchell
By Victor J. Evans
Attorney

UNITED STATES PATENT OFFICE.

JACOB MITCHELL, OF SIXTEEN, MONTANA.

LOCK NUT AND BOLT.

1,190,445.

Specification of Letters Patent.

Patented July 11, 1916.

Application filed January 13, 1915. Serial No. 2,035.

*To all whom it may concern:*

Be it known that I, JACOB MITCHELL, a citizen of the United States, residing at Sixteen, in the county of Meagher and State of Montana, have invented new and useful Improvements in Lock Nuts and Bolts, of which the following is a specification.

The present invention relates to improvements in means for locking a nut upon a bolt, and one of the objects of the same is to provide an improved construction of a nut and bolt and a pin co-acting with the nut and bolt for locking the same.

A further object of the invention is to provide a bolt which has its shank formed with an elongated longitudinally extending slot and the portions opposite the slot bulged outwardly to form spring members which normally serve as a retarding means for preventing the unscrewing of the nut when arranged upon the bolt, and to further provide the nut with transverse openings which intersect its bore, whereby a removable key may be passed through the said opening and through a slot in the bolt to effectively but removably secure the nut upon the bolt.

With the above and other objects in view, the improvement resides in the construction, combination and arrangement of parts set forth in the following specification and falling within the scope of the appended claim.

In the drawing: Figure 1 is an elevation illustrating a nut and bolt connected in accordance with the present invention, Fig. 2 is a sectional view on the line 2—2 of Fig. 1, and Fig. 3 is a transverse sectional view on the line 3—3 of Fig. 2.

Referring now to the drawing in detail, 1 designates a headed bolt and 2 a nut therefor. The threaded shank of the bolt 1 from a slight distance beyond its outer and free end is slotted longitudinally, the said slot dividing the threaded shank into two spring members, each of the said members being bulged outwardly from the central longitudinal axis of the bolt. Thus it will be noted that the portions of the shank to the opposite sides of the bolt are of a greater cross sectional diameter including the area provided by the slot than the outer threaded end of the shank, and it will be further noted that as the said members embody a certain but desired amount of natural resiliency the same will offer a resistance to the nut 2 when the same is threaded thereon and as a consequence serve as retarding means for the nut either when the same is screwed upon the bolt or when the same is unscrewed therefrom. The length and width of the slot, which is indicated by the numeral 3 is sufficient to at all times retain the said threaded members 4—4 in proper spaced relation with each other and also to receive a key in the nature of a cotter pin 5 which is passed through any of a plurality of radially disposed openings 6 formed upon the nut.

A device constructed as herein described provides an effective lock for the nut when the said nut is subjected to extraordinary vibration, and by arranging the openings in the nut the cotter pin passing through the openings and through the slot in the bolt, will have the function of preventing an inward movement of the spring portions of the shank of the bolt, and so it will be noted that the improvement may be employed with efficiency upon devices subjected to a greater strain from vibration.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

In a nut having its shank formed with a central longitudinal opening to divide the said shank into two oppositely disposed outwardly bulging spring portions that are adapted to be compressed or forced together by a nut and to exert an outward spring pressure on the said nut, and a member passing transversely through the nut and through the opening in the bolt to sustain the spring portions of the bolt against inward movement, one toward the other at the portion of the shank engaged by the nut.

In testimony whereof I affix my signature in presence of two witnesses.

JACOB MITCHELL.

Witnesses:
   MICHAEL L. CAVANAUGH,
   JAMES SMITH.

Copies of this patent may be obtained for five cents each, by addressing the "Commissioner of Patents, Washington, D. C."